(12) United States Patent
Kikuchi et al.

(10) Patent No.: US 6,804,185 B2
(45) Date of Patent: Oct. 12, 2004

(54) OPTICAL PICKUP AND INFORMATION RECORDING AND/OR REPRODUCING APPARATUS INCLUDING THE SAME

(75) Inventors: Ikuya Kikuchi, Tsurugashima (JP); Takanori Maeda, Tsurugashima (JP); Mitsuru Sato, Tsurugashima (JP); Masayuki Iwasaki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 301 days.

(21) Appl. No.: 09/738,949

(22) Filed: Dec. 18, 2000

(65) Prior Publication Data

US 2001/0021162 A1 Sep. 13, 2001

(30) Foreign Application Priority Data

Dec. 20, 1999 (JP) ............................................. 11-361216

(51) Int. Cl.⁷ ................................................. G11B 7/00
(52) U.S. Cl. ............................. 369/112.02; 369/110.04; 369/112.16
(58) Field of Search ........................... 369/44.23, 44.24, 369/110.04, 112.02, 112.16, 112.23

(56) References Cited

U.S. PATENT DOCUMENTS

| | | | | |
|---|---|---|---|---|
| 5,901,131 A | * | 5/1999 | Ootaki et al. ............ | 369/112.02 |
| 5,930,219 A | * | 7/1999 | Kim ........................ | 369/112.02 |
| 5,949,748 A | * | 9/1999 | Iwasaki et al. ............ | 369/53.2 |
| 6,034,935 A | * | 3/2000 | Kim et al. .............. | 369/112.02 |
| 6,052,353 A | * | 4/2000 | Fujita ..................... | 369/112.09 |
| 6,151,154 A | * | 11/2000 | Ogasawara et al. ..... | 369/112.02 |
| 6,160,783 A | * | 12/2000 | Tsuchiya et al. ........ | 369/112.02 |
| 6,167,019 A | * | 12/2000 | Tsuchiya et al. ........ | 369/112.02 |
| 6,324,137 B2 | * | 11/2001 | Tanase et al. ........... | 369/112.02 |
| 6,487,160 B1 | * | 11/2002 | Iida et al. ............... | 369/112.02 |

* cited by examiner

*Primary Examiner*—Nabil Hindi
(74) *Attorney, Agent, or Firm*—Morgan, Lewis & Bockius LLP

(57) ABSTRACT

A variable optical unit is provided with at least two phase-shift regions for providing light with phase differences. Phase-shift amount of the phase-shift region is adjusted by the applied voltage in accordance with birefringence of an information medium. A light beam emitted from a light source is incident on the variable optical unit through a collimator lens and a beam splitter. The light beam is polarized in accordance with the aforementioned phase-shift amount of the variable optical unit and converged by an objective lens to radiate the information medium. The reflected light polarized due to the effect of the birefringence of the information medium is polarized again according to the phase-shift amount of the variable optical unit. The reflected light is thereby polarized in the direction in which the beam splitter can reflect the reflected light and then the reflected light reflected by the beam splitter is detected by the condenser lens and an optical detector.

8 Claims, 6 Drawing Sheets

LINEAR POLARIZATION

ELLIPTICAL POLARIZATION

ELLIPTICAL POLARIZATION

LINEAR POLARIZATION

OPTICAL PICKUP AND INFORMATION RECORDING AND/OR REPRODUCING APPARATUS INCLUDING THE SAME

BACKGROUND OF THE INVENTION

1. Field of the Invention

The present invention relates to an optical pickup and a recording and/or reproducing apparatus for optically recording and/or reproducing information on an information medium.

2. Description of the Related Art

An optical disc such as a CD (Compact Disc) or DVD (Digital Video Disc or Digital Versatile Disc) is known as an information medium used for optical information recording and reproduction.

The optical disc has a multi-layered structure including a recording layer, a light transmitting layer, and a protection layer. The recordation and reproduction of information data is done by irradiating a light beam onto the recording layer through the light-transmitting layer.

FIG. 1 illustrates a configuration of a known optical pickup for such recordation and/or reproduction of information as mentioned above. Referring to the figure, the optical pickup includes a light source 100 for emitting a linear polarization laser beam, a collimator lens 101, a beam splitter 102, a quarter-wave plate 103, an objective lens 104, a condenser lens 105, and an optical detector 106.

A linear polarization laser beam (i.e., laser beam for information recording) which is modulated by information data to be recorded is emitted from the light source 100 to record the information data on the optical disc. The laser beam is, then, collimated by the collimator lens 101 to pass through the beam splitter 102. Subsequently, the laser beam is circularly polarized by the quarter-wave plate 103 and then converged by the objective lens 104. The laser beam is thereby provided with a small diameter for radiation (hereinafter referred to as the main beam) to radiate the recording layer of the optical disc 107 through the light transmitting layer. This allows the information data to be recorded on the recording layer by the optical energy of the main beam.

In addition, a laser beam for reading information is emitted from the light source 100 to read information on the optical disc. The laser beam for reading information has a small diameter of radiation to form the main beam and is allowed to radiate the recording layer of the optical disc 107 through the light transmitting layer as in the case of recording information. Moreover, reflected light produced by radiating the optical disc 107 with the aforementioned main beam passes through the objective lens 104 and is then polarized by the quarter-wave plate 103 to be orthogonal to the laser beam emitted from the light source 100. The reflected light is thereby reflected by the beam splitter 102 toward the condenser lens 105 and then converged by the condenser lens 105 to be received by the optical detector 106, thereby allowing the information to be read.

An information recording medium having a higher recording density and a larger capacity has been in increasing demands. To respond to the demands, an attempt has been made to increase the numerical aperture NA of the objective lens.

However, an increase in the numerical aperture NA of the objective lens would not allow the aforementioned known pickup to detect the reflected light with high accuracy due to birefringence resulting from the optical characteristics of the light transmitting layer and the recording layer of the optical disc. Thus, different difficulties to be solved have occurred, such as in implementing appropriate reading of information and implementing appropriate servo control for recording information.

More specifically, the optical pickup shown in FIG. 1 allows a linear polarization laser beam to be emitted from the light source 100 and pass through the beam splitter 102. Then, the laser beam is circularly polarized by means of the quarter-wave plate 103 to form a circularly polarized laser beam with which the optical disc 107 is radiated. Subsequently, circularly polarized reflected light produced by the radiation of the laser beam is polarized by the quarter-wave plate 103 to form a linear polarization laser beam. The resulting laser beam is reflected by the beam splitter 102 and then detected by the optical detector 106 via the condenser lens 105.

The presence of birefringence in the optical disc 107, however, causes the reflected light to be elliptically polarized whereas a circularly polarized light beam is to radiate the optical disc 107. Accordingly, every light beam is not linearly polarized when the elliptically polarized reflected light passes through the quarter-wave plate 103. Part of the reflected light passes through the beam splitter 102 to return to the collimator lens 101, whereas the remaining linear polarization reflected light is reflected by the beam splitter 102 to reach the optical detector 106. This makes it impossible to detect the due amount of reflected light on the optical detector 106, thus resulting, for example, in a decrease in S/N. In addition, it is necessary to take countermeasures against an adverse effect to be exerted, by the part of the reflected light through the collimator lens 101, on the semiconductor laser diode provided in the light source 100.

In particular, an increase in numerical aperture NA of the objective lens 104 to provide the optical disc 107 with a higher density would cause the range of the angle of the light beam incident to the optical disc 107 to become larger. This causes the distribution of birefringence, which is dependent on the incident angle, to be more spread in the pupil plane of the disc, thus making the effect of the birefringence greater to such an extent that it cannot be neglected. In addition, with the aforementioned prior-art optical pickup, use of a short-wavelength laser beam to implement a higher density would make it difficult to reduce the effect of the birefringence in the optical disc 107.

OBJECT AND SUMMARY OF THE INVENTION

The present invention was made in view of the above problems. It is therefore an object of the present invention to provide an information recording and/or reproducing apparatus and an optical pickup, which can prevent the effect of birefringence to allow highly accurate recording and reading of information.

It is another object of the present invention to provide an information recording and/or reproducing apparatus and an optical pickup, which can prevent the effect of birefringence to allow highly accurate recording and reading of information even when an objective lens with a greater numerical aperture or a laser beam of a shorter wavelength for reading or recording information is employed.

According to the present invention, there is provided an optical pickup including a light source, an optical element having a polarization characteristic of allowing transmittance or reflectance to be changed according to a polarization of incident light and an objective lens, wherein a light beam emitted from the light source is transmitted or reflected in one direction of the optical element and converged by the objective lens to radiate an information medium therewith, and the reflected light beam from the information medium passes through the objective lens to be incident on the optical element in another direction thereof as well as being reflected by the optical element to perform optical detection, which comprises a variable optical unit, disposed between the optical element and the objective lens, for providing incident polarized light with a phase difference.

According to another aspect of the present invention, the optical pickup further comprises control means for variably controlling a phase-shift amount of the variable optical unit, wherein the control means controls the phase-shift amount of the variable optical unit according to birefringence of the information medium.

According to another aspect of the present invention, the control means controls the phase-shift amount of the variable optical unit according to birefringence of each information medium.

According to another aspect of the present invention, the variable optical unit is formed of a photoelectric element having a photoelectric effect to be changed in accordance with an applied voltage.

According to another aspect of the present invention, the variable optical unit is formed of a liquid crystal element having a photoelectric effect to be changed in accordance with a voltage applied thereto.

According to the present invention, there is provided an information recording and/or reproducing apparatus having the optical pickup, wherein the light source emits light for reading information and the reflected light from an information medium is optically detected when reading information, and the light source emits light for recording the information when recording information.

According to the above-described optical pickups, the amount of phase-shift of the variable optical unit is adjusted according to the birefringence of the information medium. It is thereby made possible to polarize the reflected light from the information medium in the direction in which the optical element reflects the reflected light, thus optically detecting the entire amount of the reflected light.

A light beam emitted from the light source passes through the optical element to be incident on the variable optical unit. The light beam is polarized according to the phase sift amount which corresponds to the birefringence of the information medium when passing through the variable optical unit and converged by the objective lens to radiate the information medium.

Subsequently, the light beam which has radiated the information medium is reflected by the information medium. The reflected light passes again through the objective lens and is then transmitted from the variable optical unit to be incident on the optical element. The reflected light is further polarized according to the phase-shift amount which corresponds to the birefringence of the information medium when the aforementioned reflected light passes through the variable optical unit.

The reflected light, which has passed through the variable optical unit, is thereby polarized in such a direction in which the optical element can reflect the reflected light, so that the reflected light is further reflected by the optical element to be detected. Consequently, it is made possible to detect the substantially entire amount of the reflected light, thus enabling improvement in accuracy of reading information.

In addition, it is made possible to detect the substantially entire amount of the reflected light when the reflected light is optically detected to generate various servo signals in order to record information, thereby improving the accuracy when recording information.

In particular, the present invention provides an optical pickup which is suitable for preventing the effect of birefringence in the information medium where an objective lens with a greater numerical aperture or light of a shorter wavelength emitted from the light source is employed to provide the information medium with a higher density.

According to the above-described configuration, the aforementioned optical pickup makes it possible to prevent the effect of birefringence in the information medium. Thus, such an information recording and/or reproducing apparatus can be provided which is adapted for an information medium with a high density.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

The embodiment of the present invention will be explained below with reference to the accompanying drawings.

Figure 1:
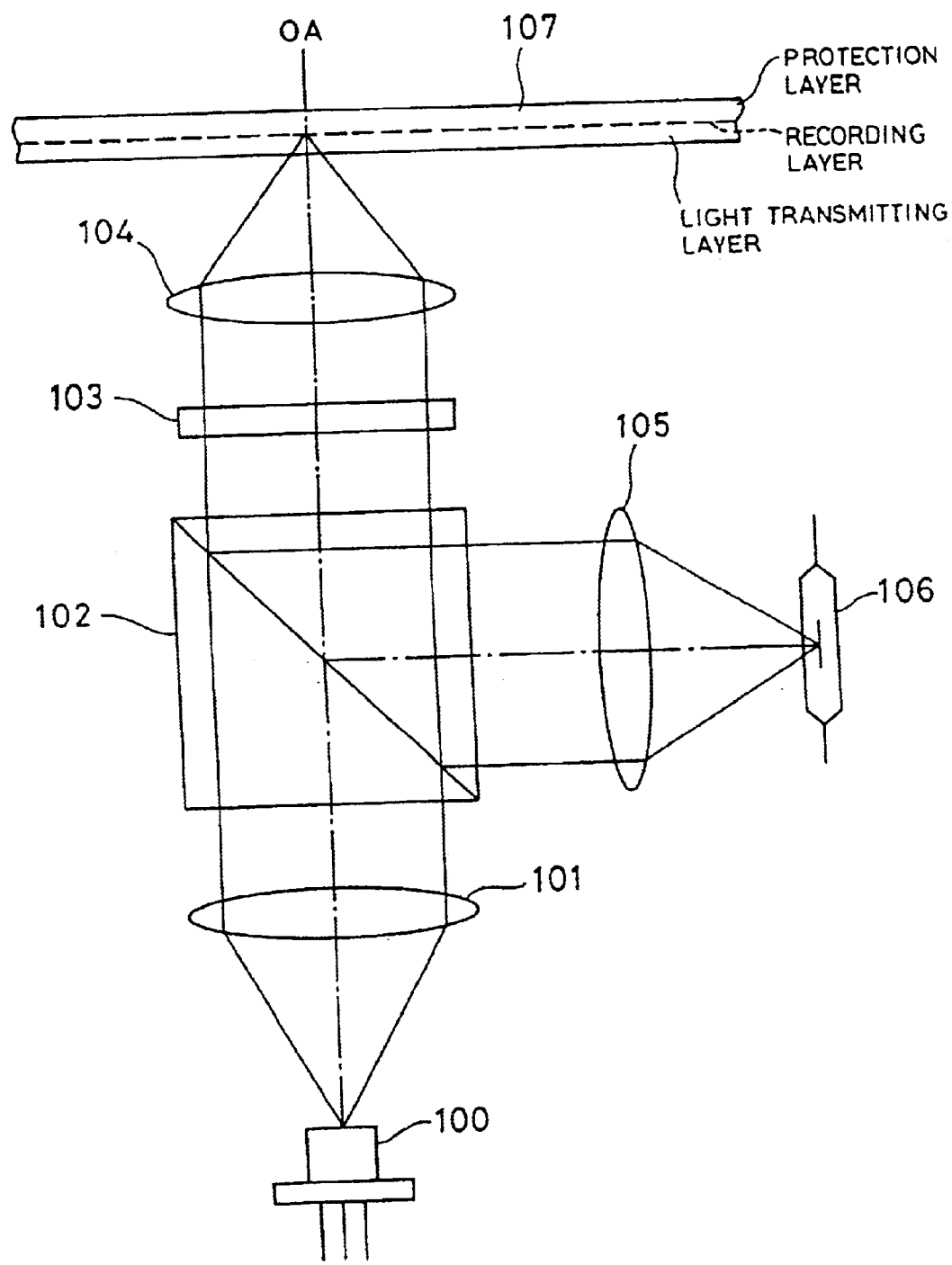
FIG. 1 is a view illustrating the configuration of a prior-art pickup.
Figure 2:
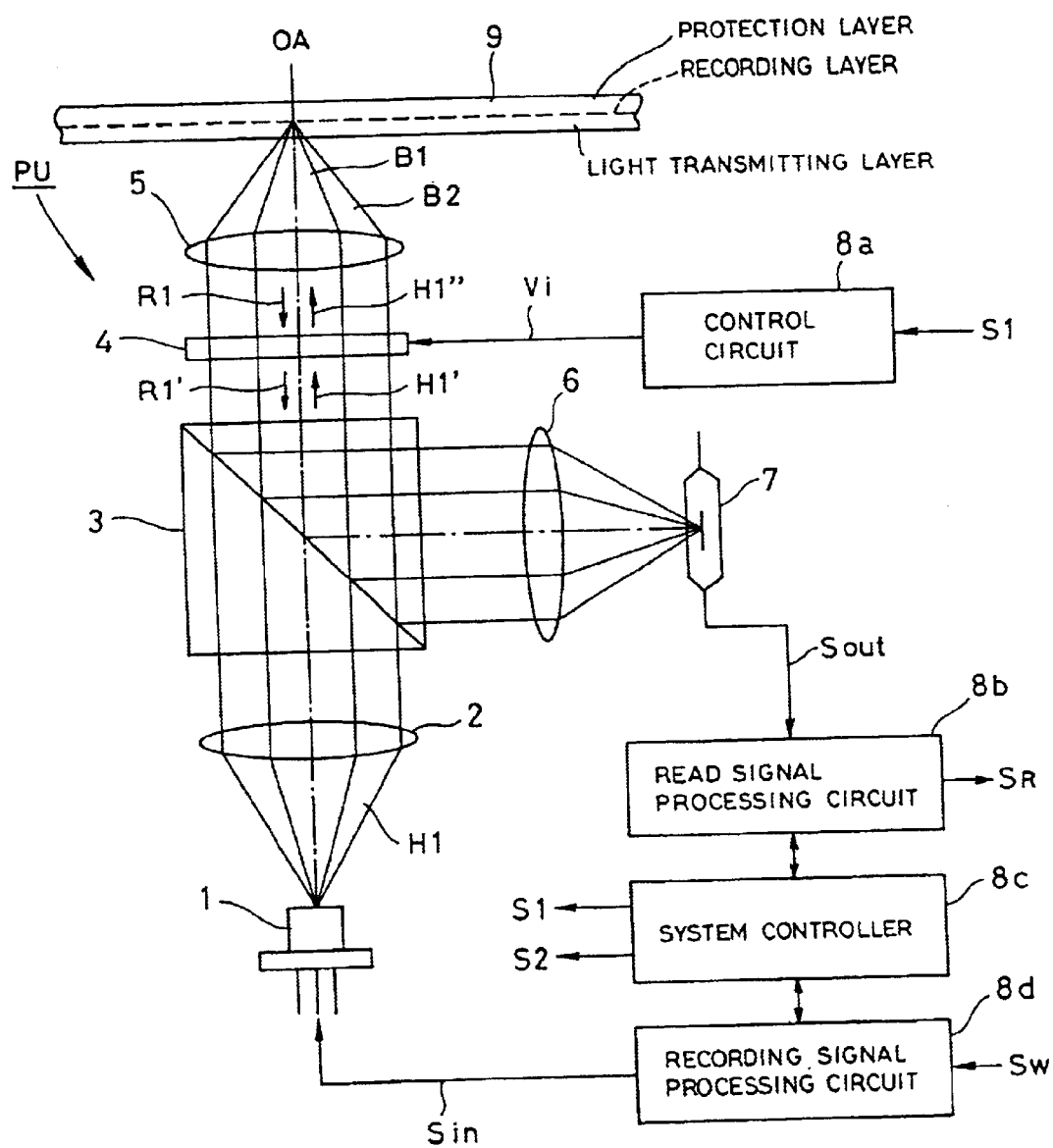
FIG. 2 is a view illustrating the configuration of an optical pickup provided in an information recording and/or reproducing apparatus according to an embodiment of the present invention.

FIG. 2 is a block diagram illustrating the configuration of an optical pickup provided in an information recording and/or reproducing apparatus.

Referring to the figure, the optical pickup PU includes a light source 1 for emitting a linear polarization laser beam H1 of a predetermined wavelength λ, a collimator lens 2, a beam splitter 3, a variable optical unit 4, an objective lens 5, a condenser lens 6, and an optical detector 7. These components 1 to 7 are arranged along an optical axis OA.

In addition, a control circuit 8a for controlling the optical characteristics of the variable optical unit 4 is provided in the optical pickup PU or in the information recording and/or reproducing apparatus. Moreover, the optical pickup PU is adapted to record and read information on an information medium 9 under the control of a read signal processing circuit 8b, a system controller 8c, and a recording signal processing circuit 8d, which are provided in the information recording and/or reproducing apparatus.

In the above-described configuration, the variable optical unit 4 includes an electro-optic element. The electro-optic effect of the electro-optic element is varied by an electric field applied to the element. More specifically, the variable optical unit 4 includes a liquid crystal element which brings about a change in birefringence according to a control voltage Vi applied by the control circuit 8a.

Figure 3:
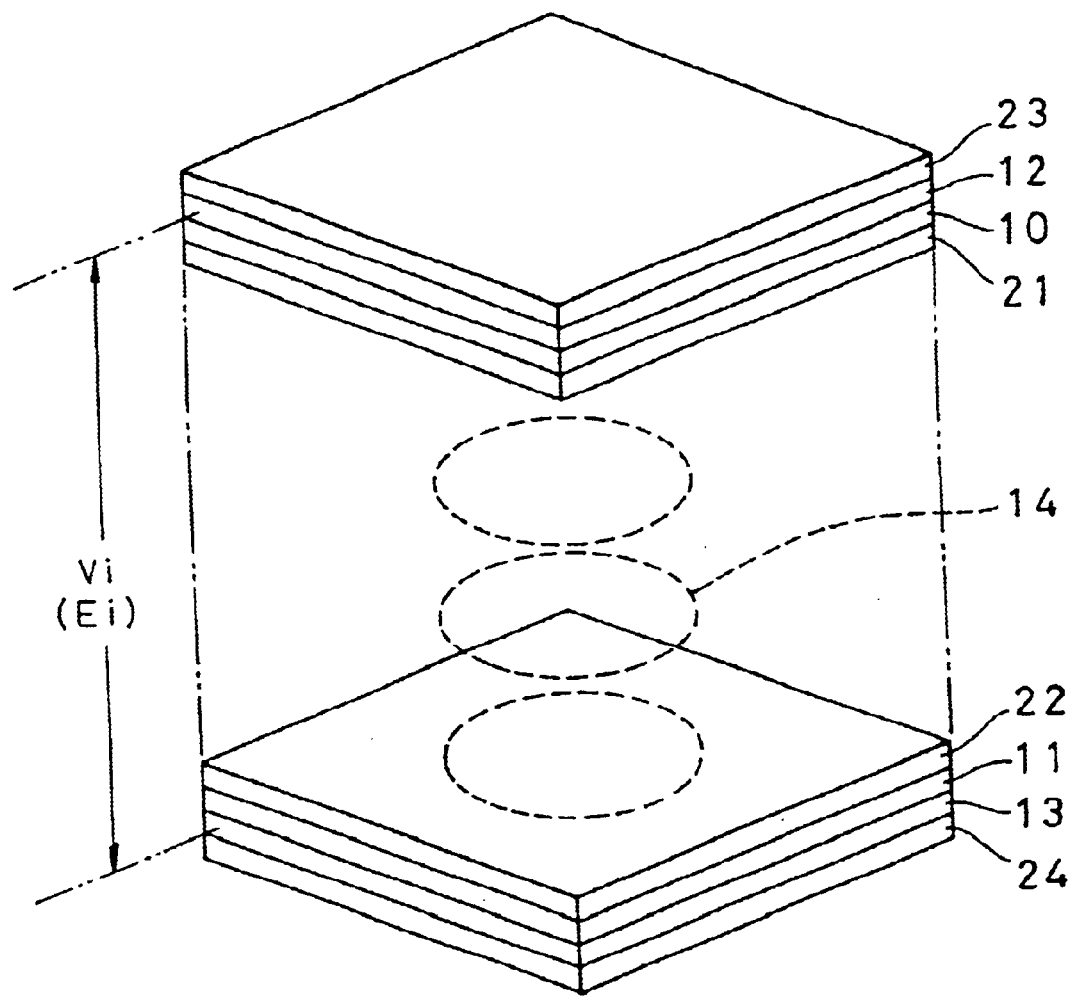
FIG. 3 is an explanatory view illustrating the structure and function of a variable optical unit provided in the optical pickup.

The variable optical unit 4 has a liquid crystal 14 sealed in between two transparent glass substrates 23, 24, as schematically shown in FIG. 3. The glass substrates 23, 24, disposed opposite to each other, have electrode portions 12, 13, insulation films 10, 11, and liquid crystal orientation films 21, 22, each formed on each opposing surface thereof.

Application of the control voltage Vi across the electrode portions 12, 13 causes a change in the arrangement of the liquid crystal 14 according to an electric field Ei caused by the control voltage Vi. Consequently, light passing through the liquid crystal 14 is changed in polarization due to the birefringence of the liquid crystal 14. The control voltage Vi applied to the liquid crystal 14 can be employed to control the polarization state.

In addition, the variable optical unit 4 can transmit a light beam in either direction. The variable optical unit 4 provides a light beam incident from the electrode portion 12 and the insulation film 10 with a phase difference $\delta i$ to transmit the light beam toward the insulation film 11 and the electrode portion 13. Moreover, the variable optical unit 4 provides the light beam incident from the electrode portion 13 and the insulation film 11 with a phase difference $\delta i$ to transmit the light beam toward the insulation film 10 and the electrode portion 12. The variable optical unit 4 allows any one of the electrode portions 12, 13 to be disposed opposed to the objective lens 5 since light can pass through the variable optical unit 4 in either direction.

Figure 4:
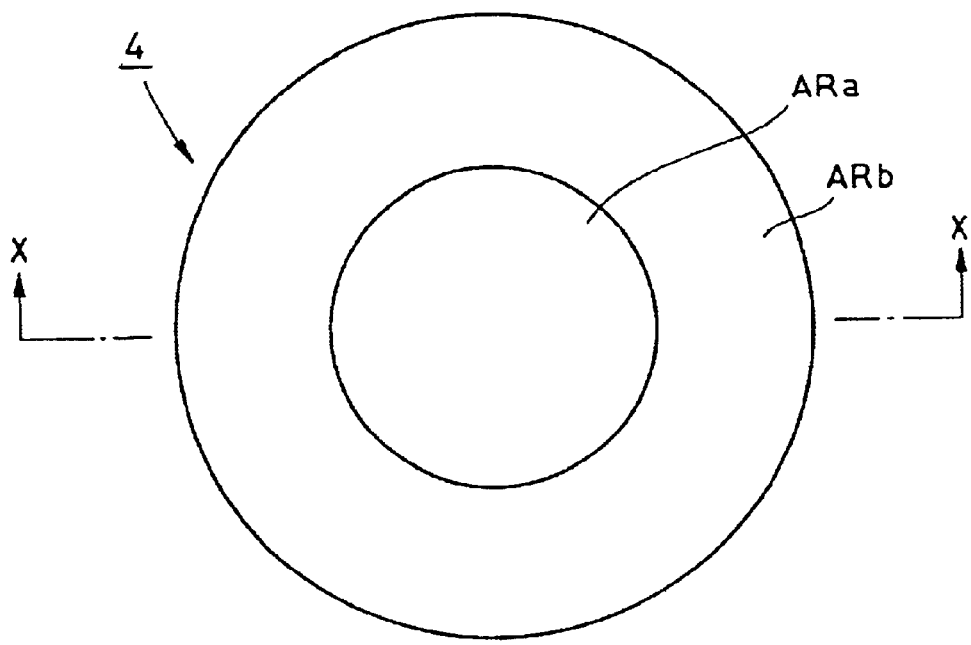
FIG. 4 is a plan view illustrating the shape of phase-shift regions provided on the variable optical unit.

In addition, two concentric phase-shift regions ARa, ARb with centers at the optical axis OA are defined as shown in the plan view of FIG. 4 when the variable optical unit 4 is viewed from the optical axis OA. The phase-shift regions ARa, ARb is implemented by concentric transparent electrode (ITO: Indium Tin Oxide) layers formed on the electrode portion 12.

Figure 5:
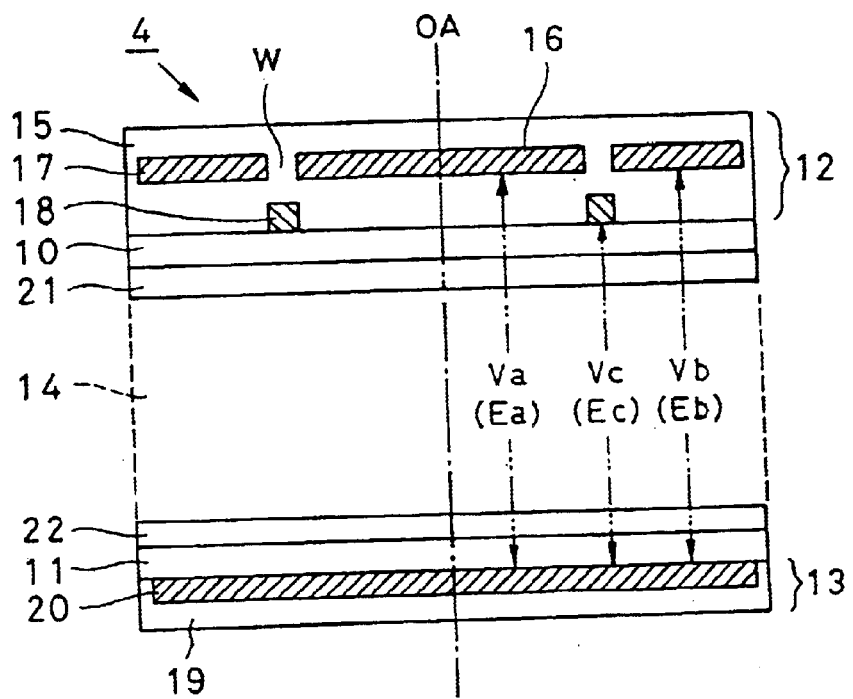
FIG. 5 is a cross-sectional view illustrating the structure of the phase-shift regions provided on the variable optical unit.

The electrode portion 12 includes transparent electrode layers 16, 17 and a transparent electrode layer 18 as shown in the cross-sectional view of FIG. 5 (which illustrates a cross-sectional structure taken along line X—X of FIG. 4). The transparent electrode layers 16, 17 are electrically isolated from each other and buried in a transparent insulation layer 15, and the transparent electrode layer 18 is disposed opposed to a gap portion W between the transparent electrode layers 16, 17 and buried in the insulation layer 15.

Furthermore, the transparent electrode layer 16 is formed in a circular shape corresponding to the first phase-shift region ARa, while the transparent electrode layer 17 is formed in an annular shape corresponding to the second phase-shift region ARb. The transparent electrode layer 18 is formed in an annular shape having a very narrow width to the gap portion W. The electrode portion 13 comprises a circular transparent electrode layer 20 buried in a transparent electrode layer 19. The outer diameter of the transparent electrode layer 20 is made approximately equal to that of the transparent electrode layer 17.

The transparent electrode layer 20 is set to a common potential. The control circuit 8a is adapted to apply the control voltage Vi to each of the transparent electrode layers 16, 17, 18 and the transparent electrode layer 20 so as to apply different voltages Va, Vb, Vc. The variable optical unit 4 is provided, on the outer rim portion thereof, with terminals (not shown in FIG. 5) for applying the aforementioned voltages Va, Vb, Vc to each of the transparent electrode layers 16, 17, 18, 20.

Figure 6:
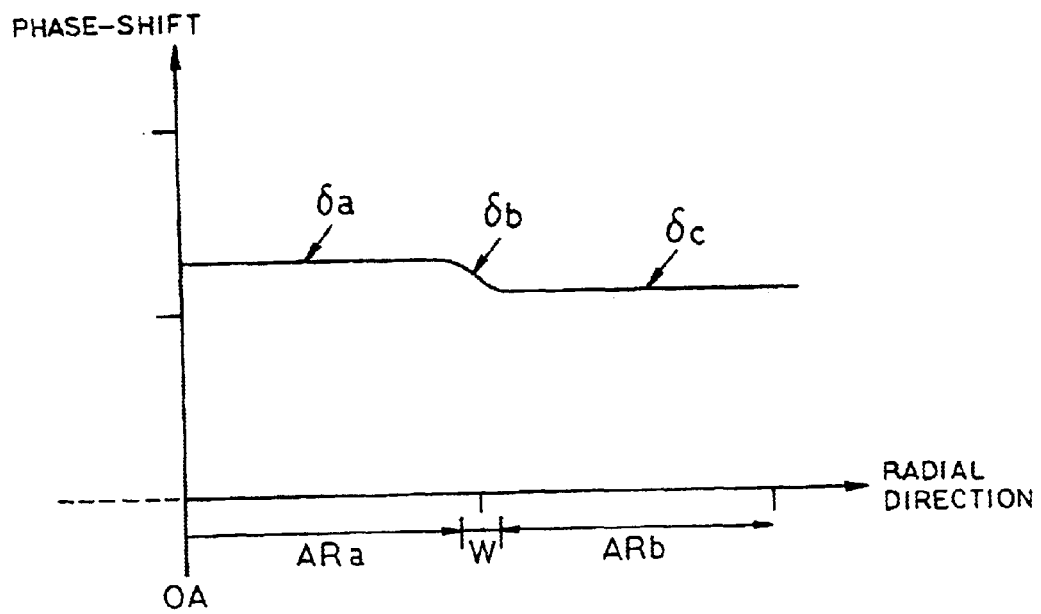
FIG. 6 is a characteristic graph for illustrating the operation of the variable optical unit.

According to the above-described structure, part of the liquid crystal 14 between the transparent electrode layers 16 and 20 is changed to show birefringence according to an electric field Ea produced by the voltage Va. On the other hand, the liquid crystal between the transparent electrode layers 17 and 20 is changed to show birefringence according to an electric field Eb produced by the voltage Vb. As shown in FIG. 6, controlling the voltages Va, Vb will thereby enable independent control of each of the phase difference $\delta i$ of the liquid crystal in the first phase-shift region ARa and the phase difference $\delta i$ in the second phase-shift region ARb. This allows for controlling phase-shifts $\delta a$, $\delta b$ independently for each of the light beams in the first phase-shift region ARa and the second phase-shift region ARb.

In addition, appropriate control of the voltage Vc allows for changing continuously and smoothly the phase difference $\delta i$ of the liquid crystal in the gap portion W between the first phase-shift region ARa and the second phase-shift region ARb. This in turn allows for continuously and smoothly changing the phase difference $\delta c$ of the light in the gap portion W.

The operation of the optical pickup PU will be explained hereinbelow with reference to FIGS. 2 to 7. Incidentally, such a case is taken as an example in which information is read or recorded on the information medium 9 such as a CD or DVD.

The system controller 8c supplies a control signal S1 to the control circuit 8a to adjust the control voltage Vi. This allows the predetermined voltages Va, Vb, Vc to be applied to the transparent electrode layers 16, 17, 18, 20 of the variable optical unit 4 shown in FIGS. 4 and 5 in order to adjust the amount of phase-shift $\delta a$ (for providing a phase difference to light) of the first phase-shift region ARa and the amount of phase-shift $\delta b$ of the second phase-shift region ARb.

The aforementioned voltages Va, Vb, Vc are controlled on the basis of, for example, birefringence data of the already-known manufacturing data of the information medium 9. Thus, the phase-shift regions ARa, ARb are adjusted to the phase-shift amounts $\delta a$, $\delta b$ corresponding to the birefringence in the pupil plane of the information medium 9 when the information medium 9 is radiated with a light beam to be described later.

In other words, the magnitude of the birefringence in the pupil plane of the information medium 9 depends on the incident angle of the light beam. Thus, the phase-shift amount $\delta a$ of the phase-shift region ARa is adjusted according to the birefringence to which subjected is a light flux B1 (having a small angle of incidence) incident on the pupil plane of the information medium 9 through the phase-shift region ARa. The phase-shift amount $\delta b$ of the phase-shift region ARb is also adjusted according to the birefringence to which subjected is a light flux B2 (having a large angle of incidence) incident on the pupil plane of the information medium 9 through the phase-shift region ARb. For example, suppose that the light flux B1 having a small angle of incidence is subjected to a birefringence of $\delta 1$ on the pupil plane of the information medium 9. In this case, the phase-shift amount δa of the phase-shift region ARa is adjusted to a phase-shift amount that provides a phase difference of (−δ1+π/2). On the other hand, suppose that the light flux B2 having a large angle of incidence is subjected to a birefringence of δ2 on the pupil plane of the information medium 9. In this case, the phase-shift amount δb of the phase-shift region ARb is adjusted to a phase-shift amount that provides a phase difference of (−δ2+π/2).

The phase-shift amounts δa, δb of the phase-shift regions ARa, ARb of the variable optical unit 4 are adjusted as such in advance, and thereafter reading or recording information is carried out.

The recording signal processing circuit 8d supplies a drive signal Sin to the light source 1 to read information based on the instruction of the system controller 8c, thereby allowing the laser beam H1 having a constant power to be emitted.

Figure 7A:
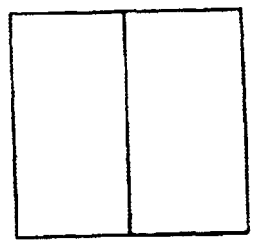
FIG. 7A through 7D are views for illustrating the operation of the optical pickup.

The collimator lens 2 collimates the laser beam H1 to be incident on the beam splitter 3. Then, as shown in FIG. 7A, the laser beam H1 is linearly polarized to be fit for the beam splitter 3 and thus passes through the beam splitter 3 to be incident on the variable optical unit 4.

Figure 7B:
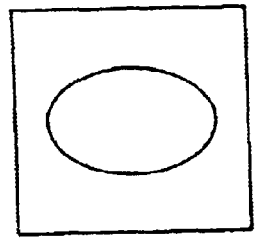

Here, the phase-shift amounts δa, δb of the phase-shift regions ARa, ARb have been adjusted to (−δ1+π/2) and (−δ2+π/2) as described above, respectively. Accordingly, when passing through the phase-shift regions ARa, ARb, a linear polarization laser beam H1' to be incident on the variable optical unit 4 is polarized into an elliptically polarized laser beam H1'', which is shown in FIG. 7B, to be incident on the objective lens 5. Moreover, the laser beam H1'' is converged by the objective lens 5, thereby generating a light beam of a small diameter for reading information, which radiates the information medium 9 from the light transmitting layer to the recording layer.

Figure 7C:
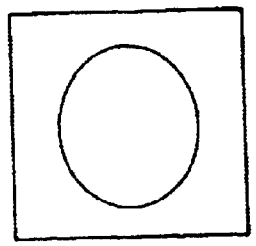

The recording layer of the information medium 9 is radiated with the information read light beam, thereby producing reflected light which is then incident on the variable optical unit 4 through the objective lens 5. Here, the aforementioned light beam is subjected to the birefringence of the information medium 9. This causes the reflected light R1 incident on the variable optical unit 4 to be elliptically polarized or nearly circularly polarized as shown in FIG. 7C. This is a result of the fact that the aforementioned information read light beam that has been elliptically polarized is further polarized by the information medium 9.

The light flux B1 of the light beam having a small angle of incidence is subjected to a birefringence δ1 and the light flux B2 of the light beam having a small angle of incidence is subjected to a birefringence δ2 on the pupil plane of the information medium 9. In addition, the birefringence δ1 is different from the birefringence δ2. Suppose that the information read light beam is incident on the information medium 9. In this case, the reflected light R1 is subjected to the influence of the birefringences δ1 and δ2, and thereby elliptically polarized or nearly circularly polarized to be incident on the variable optical unit 4.

Figure 7D:
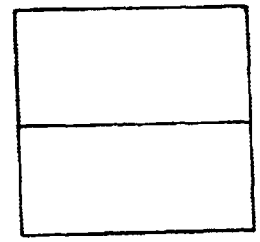

Furthermore, when passing through the variable optical unit 4, the reflected light R1 is further polarized due to the phase-shift δa, δb of the phase-shift regions ARa, ARb, thereby being linearly polarized as shown in FIG. 7D. In addition, the linearly polarized reflected light R1' is reflected by the beam splitter 3 to be incident on the condenser lens 6.

In other words, the reflected light R1 becomes the linearly polarized reflected light R1' when the elliptically polarized reflected light R1 that is nearly circularly polarized is incident on the variable optical unit 4. This is a result of the effect of the phase-shift δa, δb of the phase-shift regions ARa, ARb or, for example, the similar effect as a quarter-wave plate which changes a circularly polarized light beam into a linearly polarized beam.

The laser beam H1 is incident on the beam splitter 3 from the collimator lens 2 and the reflected light R1' is incident on the beam splitter 3 from the variable optical unit 4. The directions of polarization of the laser beam H1 and the reflected light R1' are orthogonal to each other with a phase difference π/2 (i.e., an optical path difference of λ/4), and thus the reflected light R1' is reflected toward the condenser lens 6 by the beam splitter 3. Then, the reflected light R1' is converged by the condenser lens 6 to be received by the optical detector 7.

When the optical detector 7 has received the reflected light R1' as such, the optical detector 7 converts the reflected light R1' to a photoelectric conversion signal Sout, which is in turn supplied to the read signal processing circuit 8b and undergoes encode processing to generate a read signal SR.

As described above, the optical pickup PU is provided with the variable optical unit 4 which is set to have a phase-shift amount according to the birefringence of the information medium 9. The optical pickup PU can thereby allow the reflected light R1' from the information medium 9 to be linearly polarized and reflected by the beam splitter 3, and the optical detector 7 to receive substantially the entire amount of the reflected light R1'. This makes it possible to improve an S/N (Signal to noise) ratio and implement reading information with high accuracy.

In particular, consider a case where the numerical aperture NA of the objective lens 5 is increased to provide the information medium 9 with a higher density. Even in this case, the present invention makes it possible to read information with high accuracy from the information medium 9 of a high density. This is a result of the fact that each of the phase-shift amounts δa, δb of the phase-shift regions ARa, ARb of the variable optical unit 4 can be adjusted according to the incident angle of the information read light beam for radiating the information medium 9 and the birefringence in the pupil plane of the information medium 9.

On the other hand, when recording information, the recording signal processing circuit 8d performs processing such as encoding on an input signal Sw on the basis of the instruction of the system controller 8c. Then, the drive signal Sin on which processing such as encoding has been performed is supplied to the light source 1, thereby emitting the laser beam H1 which is modulated by the drive signal Sin.

As in the aforementioned case of reading information, the laser beam H1 is collimated by the collimator lens 2 and passes through the beam splitter 3 to be incident on the variable optical unit 4. Then, the laser beam H1 is elliptically polarized by the phase-shift regions ARa, ARb when passing through the variable optical unit 4. Subsequently, the laser beam H1 is converged by the objective lens 5 to thereby become an information recording light beam having a small diameter and radiates the recording layer of the information medium 9. In this manner, recording of information is carried out.

In addition, reflected light produced by the aforementioned information recording light beam for radiating the information medium 9 reaches the optical detector 7 through the objective lens 5, the variable optical unit 4, the beam splitter 3, and the condenser lens 6. Then, the optical detector 7 converts the reflected light to the photoelectric conversion signal Sout which is in turn supplied to the system controller 8c through the read signal processing circuit 8b. Then, the system controller 8c generates a focus servo control signal S2 or the like by the so-called astigmatism method.

The optical pickup PU is provided with the variable optical unit 4 which is set to have a phase-shift amount according to the birefringence of the information medium 9. As described above, to record information, the reflected light returned from the information medium 9 is linearly polarized to be reflected by the beam splitter 3 and the substantially entire amount of the reflected light can be received by the optical detector 7. This makes it possible to improve the SIN and enable highly accurate focus servo control or the like as well as enable recording information with high accuracy.

In particular, in a case where the numerical aperture NA of the objective lens 5 is increased to provide the information medium 9 with a higher density. Even in this case, the present invention makes it possible to record information with high accuracy on the information medium 9. This is resulted from the fact that each of the phase-shift amounts δa, δb of the phase-shift regions ARa, ARb of the variable optical unit 4 can be adjusted according to the incident angle of the information recording light beam for radiating the information medium 9 and the birefringence in the pupil plane of the information medium 9.

Incidentally, the optical pickup PU according to the embodiment is adapted to generate single light beams each for reading and for recording information to carry out reading and recording information, however, the present invention is not limited thereto. An alternative example may be adapted to have a diffraction grating disposed in the optical path between the collimator lens 2 and the beam splitter 3 to carry out reading and recording information with the zero-order and +/−first-order diffracted light generated by the diffraction grating. In other words, the aforementioned zero-order diffracted light may be used to generate the information read light beam and the information recording light beam. The aforementioned +/−first-order diffracted light may also be used to generate a so-called sub-beam for detecting signals such as tracking error or crosstalk canceling signals to radiate the information medium 9. The so-called three-beam method may be employed to carry out reading and recording information.

Even with the configuration having the grating disposed therein as described above, the aforementioned zero-order and +/−first-order diffracted light are elliptically polarized by the phase-shift regions ARa, ARb when passing through the variable optical unit 4. On the other hand, the reflected light beams that are produced by radiating the information medium 9 with the elliptically polarized zero-order and +/−first-order diffracted light are each linearly polarized when passing through the variable optical unit 4. This makes it possible to prevent the effect of the birefringence of the information medium 9 to carry out reading and recording information with high accuracy.

Figure 8:
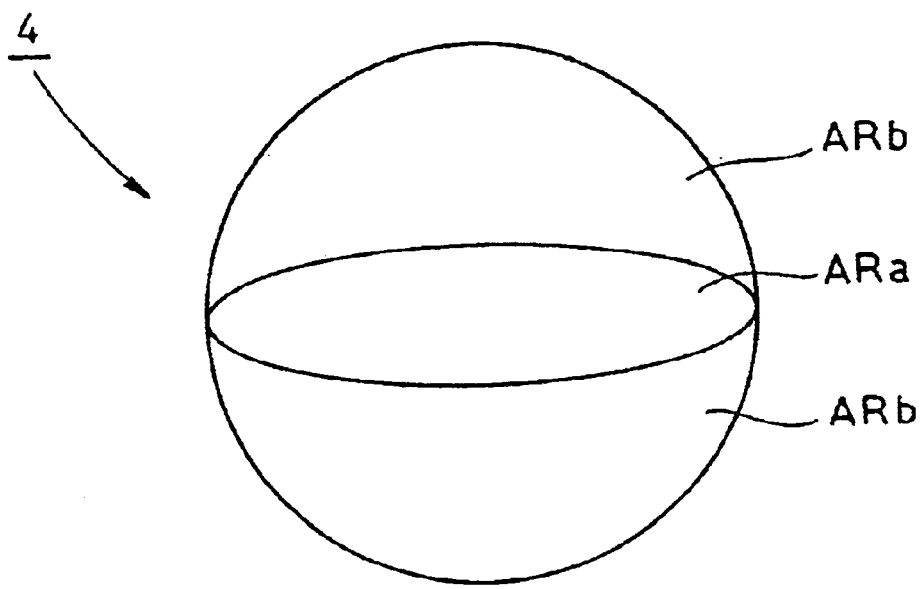
FIG. 8 is a plan view illustrating another shape of the phase-shift regions provided on the variable optical unit.
Figure 9:
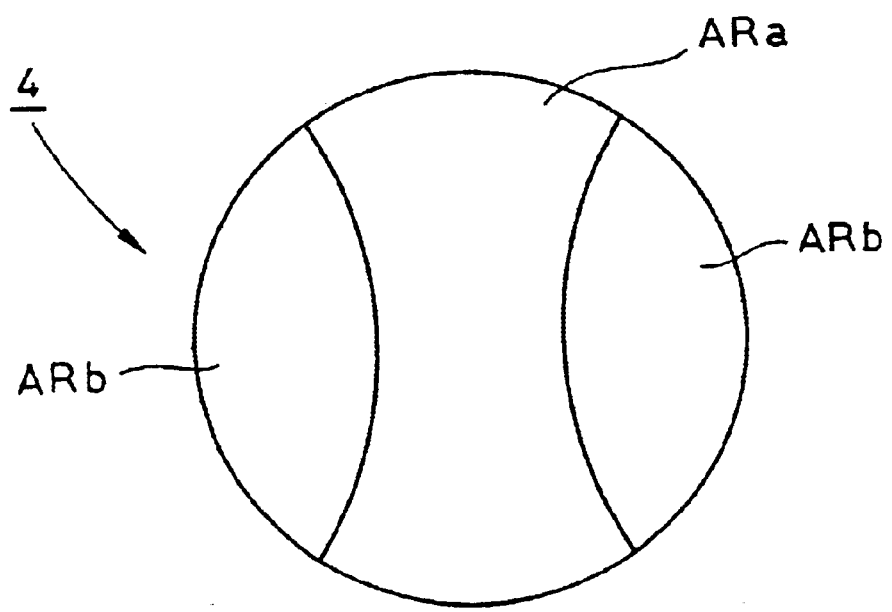
FIG. 9 is a plan view illustrating still another shape of the phase-shift regions provided on the variable optical unit.

Furthermore, as in FIG. 4, such a case has been shown in which the phase-shift regions ARa and ARb have a concentric configuration, however, the present invention is not limited thereto. For example, as shown in FIG. 8, the entire variable optical unit 4 may be formed in a circular shape when viewed from the optical axis OA. In addition, the phase-shift region ARa may be formed in an elliptical shape and the phase-shift region ARb may be formed in the remaining shape. Moreover, as shown in FIG. 9, the phase-shift region ARb may be formed in two substantially elliptical shapes and the phase-shift region ARa may be formed in the remaining shape of an egg.

It is desirable to increase the number of phase-shift regions of the variable optical unit 4 to perform fine control on the phase-shift amount of each of the phase-shift regions. However, as shown in FIGS. 4, 8, and 9, dividing the variable optical unit 4 into about three parts would make it possible in practice to prevent sufficiently the effect of the birefringence of the information medium.

In the embodiment, the phase-shift amount of the variable optical unit 4 is also adapted to be adjusted according to the birefringence data obtained by measuring the information medium 9 when manufactured, however, the present invention is not limited thereto. For example, when the information medium 9 is manufactured, measured birefringence data may be stored in advance in a predetermined recording region of the information medium 9 during the manufacturing process thereof. Then, the optical pickup PU may read the birefringence data when the information medium 9 is loaded to the information recording and/or reproducing apparatus of the present invention. The system controller 8c may also be adapted to allow the control circuit 8a to control the phase-shift amount of the variable optical unit 4 based on the birefringence data. This makes it possible to automatically control the optical pickup PU and the information recording and/or reproducing apparatus to cope with information media of a higher density, thereby implementing a more rational information recording and/or reproducing system. It is also made possible to read or record information on each information medium 9 under an appropriate condition.

Furthermore, the variable optical unit 4 of this embodiment is formed of the liquid crystal element but may be formed of other photoelectric elements.

As described above, the optical pickup PU according to the present invention includes a variable optical unit for providing light with a phase difference, the variable optical unit being disposed between an objective lens and an optical element. The optical element transmits the light emitted from the light source and reflects the light reflected from the information medium. The phase-shift amount of the variable optical unit is adjusted according to the birefringence of the information medium. This makes it possible to polarize the reflected light reflected from the information medium in the direction in which the optical element reflects the reflected light and detect optically the entire amount of the reflected light. Thus, it is made possible to detect the substantially entire amount of the aforementioned reflected light and thus obtain an improved S/N, thereby implementing reading and recording information with improved accuracy.

Furthermore, consider a case where an objective lens with a greater numerical aperture or a light beam having a shorter wavelength emitted from the light source is employed to cope with the information medium having a higher density. In this case, it is made possible to provide an optical pickup which is suitable for preventing the effect of birefringence of the information medium.

Furthermore, the information recording and/or reproducing apparatus according to the present invention is adapted to comprise the aforementioned pickup to carry out reading or recording information. This makes it possible to detect the substantially entire amount of reflected light from the information medium. It is also made possible to prevent the effect of birefringence of the information medium, thus providing an information recording and/or reproducing apparatus that can cope with an information medium having a higher density.

The invention has been described with reference to the preferred embodiments thereof. It should be understood by those skilled in the art that a variety of alterations and modifications may be made from the embodiments described above. It is therefore contemplated that the appended claims encompass all such alternations and modifications.

What is claimed is:

1. An optical pickup including a light source; and optical element having a polarization characteristic of allowing transmittance or reflectance to be changed according to a polarization of incident light; and an objective lens, wherein a light beam emitted from said light source is transmitted or reflected in one direction of said optical element and converged by said objective lens to radiate an information medium therewith, and the reflected light beam from said information medium passes through said objective lens to be incident on said optical element in another direction thereof so as to be reflected by said optical element to perform optical detection, comprising:

a polarization adjusting unit, disposed between said optical element and said objective lens, for adjusting the polarization of the light beam by providing the light beam with a phase shift so as to reduce the polarization direction change due to birefringence of said information medium.

2. An optical pickup according to claim 1, further comprising:

a detector for detecting a light beam reflected from said optical element to generate a detection signal, said detection signal representing a birefringence amount of said information medium; and a controller which controls the phase-shift amount of said polarization adjusting unit on the basis of said detection signal.

3. An optical pickup according to claim 2, wherein said controller controls the phase-shift amount of said polarization adjusting unit according to a birefringence amount corresponding to the kind of said information medium.

4. An optical pickup according to claim 1, wherein said polarization adjusting unit is formed of a photoelectric element having a photoelectric effect to be changed in accordance with an applied voltage thereto.

5. An optical pickup according to claim 1, wherein said polarization adjusting unit is formed of a liquid crystal element having a photoelectric effect to be changed in accordance with a voltage applied thereto.

6. An information recording and/or reproducing apparatus having an optical pickup according to claim 1, wherein said light source emits light for reading information and the reflected light from an information medium is optically detected when reading information, and said light source emits light for recording the information.

7. An optical pickup according to claim 1, wherein said polarization adjusting unit adjusts the polarization of the light beam such that the substantially entire light of the light beam reflected from said information medium is reflected by said optical element.

8. An optical pickup according to claim 1, wherein said polarization adjusting unit adjusts the light beam reflected from said information medium to be linear-polarized.

* * * * *